R. L. GALER & E. E. SPENCER.
COMBINED FERTILIZER AND SEED-SOWER.

No. 186,823.  Patented Jan. 30, 1877.

UNITED STATES PATENT OFFICE.

RICHERD L. GALER, OF DUNHAM, AND ELIJAH E. SPENCER, OF PARISH OF ST. ARMAND EAST, QUEBEC, CANADA.

IMPROVEMENT IN COMBINED FERTILIZER AND SEED-SOWER.

Specification forming part of Letters Patent No. 186,823, dated January 30, 1877; application filed May 22, 1876.

*To all whom it may concern:*

Be it known that we, RICHERD LUSHER GALER, of the township of Dunham, farmer, and ELIJAH EDMUND SPENCER, of the parish of St. Armand East, farmer, both in the county of Missisquoi, and Province of Quebec, Dominion of Canada, have invented certain new and useful Improvements in a Combined Fertilizer and Seed Sower; and we do hereby declare that the following is a full, clear, and exact description of the same.

Our invention consists in a combined fertilizer and seed sower with straight or crooked movable boots, divided into two flukes in such a manner that, the fertilizer being placed in the front boxes and the seed in the rear boxes, (the boots having drills and covers attached thereto,) the drills open the ground and the fertilizer falls first and then the seeds. The fertilizer and the seeds are then covered with earth by covers hinged to the boots.

The object of our invention is to produce an improved combined fertilizer and sower, capable, by means of its straight and crooked movable boots, of changing the width of the rows and furrows in which the fertilizer and the seeds fall.

Figure 1:
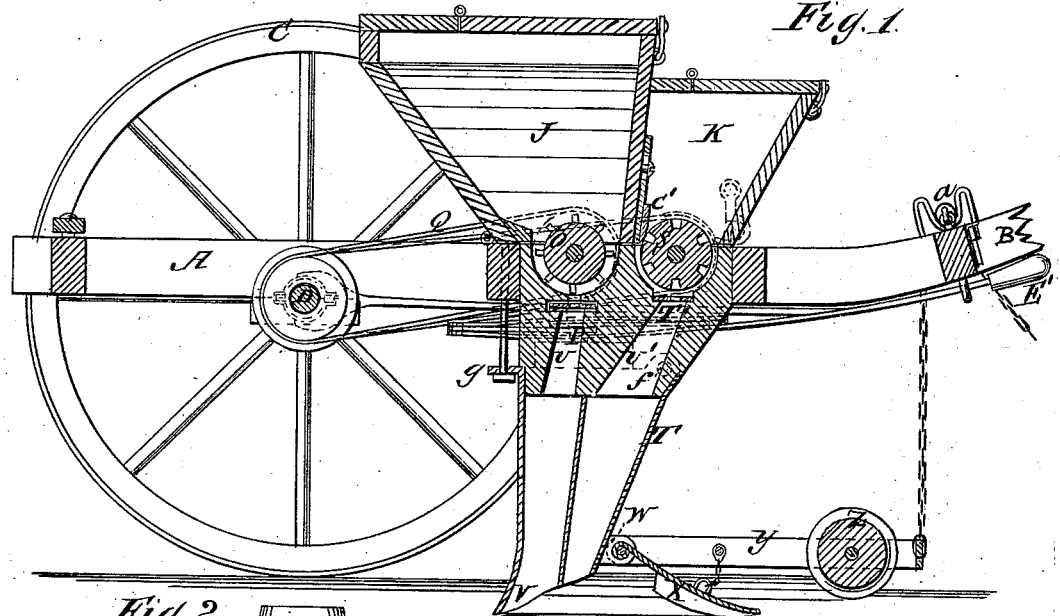
Figure 2:
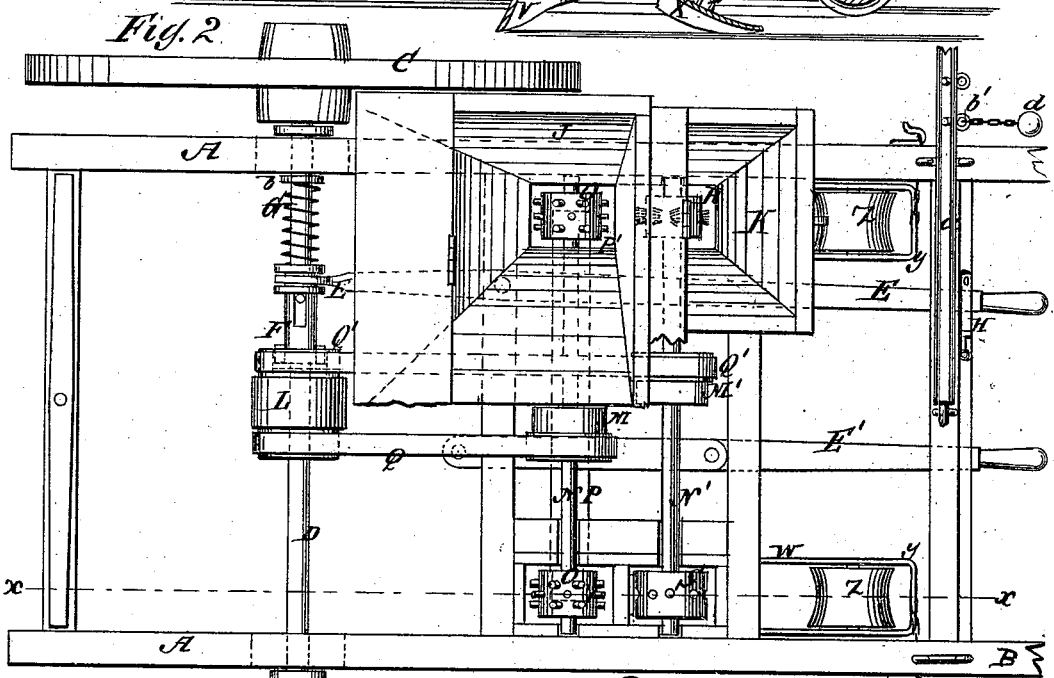
Figure 3:
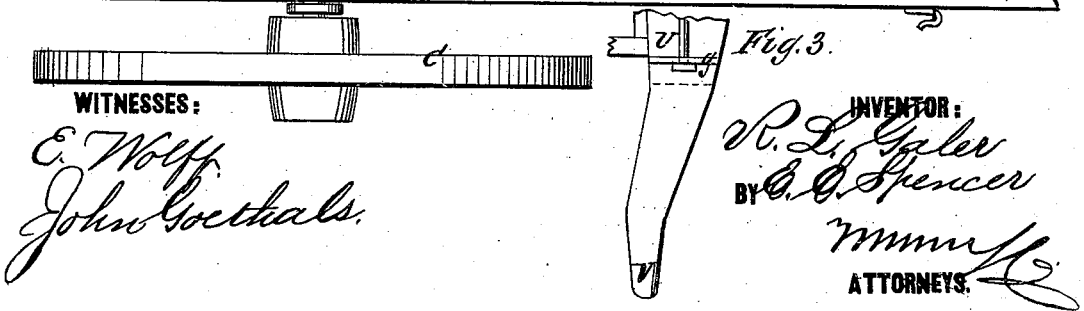

Figure 1 is a sectional elevation of the sower on lines $x\ x$, Fig. 2. Fig. 2 is a top view of the same. Fig. 3 is a detail view.

Similar letters of reference indicate corresponding parts.

A is a frame or train, having on its front cross-piece a whiffletree, to which horses are harnessed to draw the fertilizer and seed sower. The rear ends of the shafts may terminate in the handles B, by which the driver guides the sower. C C are the wheels, and D is the axle, set fast in the wheel-hubs, revolving with them, and borne by bearings bolted to the shafts. On the axle D is a free double cone-pulley, L, which is set fast by means of the hand-lever E, terminating in a crotch working in the collar of the sleeve F, and by the sleeve F, the latter having a longitudinal slot by which it slides along a pin fixed to the axle D. This sleeve has also a lug entering with it in the hole and in the notch of the cone-pulley L, revolving it when the sowing is going on. A torsional spring, G, placed between a ring, $b$, fixed to the axle D and the sleeve-collar, keeps the sleeve E from coming out, and the hand-lever is kept in its place by means of the latch H, screwed to the rear cross-piece of the sower. J is the fertilizer-box, divided into two flare seed-boxes adjoining the fertilizer-box J, which latter is hinged and hooked to the frame A. A belt, Q, passing over the cone-pulleys L, works the cone-pulley M, the latter being set fast on the axle N. The axle N has at each end a spike-drum, O, revolving in the chamber over the fertilizer-flukes. These spike-drums O are to crumble and to pulverize the fertilizer, and to push it down in the flukes. The fertilizer-flukes are opened or shut by means of the hand-lever E', working the two rectangular slides P and P' at the same time, and by the same stroke of the hand-lever E'. Another belt, Q', passing over the cone-pulley L, works the cone-pulley M', the latter being set fast on the axle N'. The axle N' has at each end, revolving in the chamber over the seed-flukes, either a movable brush, R, to push the seed down the seed-flukes, or a movable drum, S, having holes on its circumference large enough to hold the Indian corn or other large seed-grain to be sown. Pads $c$, having slot and set-screw, are placed either on the front or rear sides of the seed-boxes K to regulate the quantity of seed carried down into the seed-flukes by the movable drum S, allowing the holes to be filled even full with seed. The seed-flukes are opened or shut by means of slides T' sliding in one side of the boots. The slides have small holes through them to regulate the quantity of different seed sown.

The boots T are internally divided into two flukes, (the fertilizer-fluke U and seed-fluke U') and to their lower end are fastened the drills V. There is also a stirrup, W, surrounding each boot. To these stirrups W, and in rear of the boots, the coverers X and the frames Y are hinged by the same pin. The rollers Z are journaled to the frames Y, which frames can be lowered or raised by means of chains hooked to the shafts A. By this arrangement the drills V open the ground, tracing the furrows, into which the fertilizer falls first. The fall of the seed follows almost simultaneously, and both are covered with earth by the coverers X. Lastly, the ground is pressed by the rollers Z. By these means all the fertilizing, sowing, covering, and rolling work is done by a single operation, and at the same time, thus saving much time and labor.

The boots T can be made crooked or S-shaped, and may be cast in one piece, with or without the drill V. The boot T can be made also in such a manner that it will not reach clear up to the frame A, but will be attached to a wooden half-boot fast to the frame by a sleeve or other means. The boot T is fastened by a bolt, $f$, running through its back side, and by another bolt or hook and eye, $g$, of the boot up through the frame A, said bolt $g$ being hooked to the latter. Then, by simply removing these two bolts $f\ g$, the boot T can be removed and changed.

The boots T can be made of any shape required to change the width of the rows and the furrows in which the fertilizer and seed fall. The furrows can, by this means, be made inside or outside of the wheel-tracks, and near or distant from each other, according to the seed sown.

$a$ is a tracer composed of a pole, which may be placed on either side of the shafts, and kept in place by half-clamps, and it has also a chain, $b'$, and a tracing-ball, $d$. The pole has also a certain number of holes in which the chain-pin is placed according to the width of the rows and furrows, of the seed sown.

Having thus described our invention, we claim as new and desire to secure by Letters Patent—

1. The combination of the boot, divided so as to distribute the fertilizer in front and the seed behind it, with the coverer X and presser Z, both pivoted in a frame, Y, which is itself pivoted to the boot, as and for the purpose specified.

2. The boots T, constructed in laterally-curved shape, and connected detachably to the machine for adapting the machine to rows of different widths by interchangeable boots, substantially as specified.

RICHERD LUSHER GALER.
ELIJAH EDMUND SPENCER.

Witnesses:
J. LANDSBERG,
MORRIS LANDSBERG.